US012198154B2

(12) United States Patent
Schuster et al.

(10) Patent No.: US 12,198,154 B2
(45) Date of Patent: Jan. 14, 2025

(54) STORE TRAFFIC INDICATOR

(71) Applicant: Target Brands, Inc., Minneapolis, MN (US)

(72) Inventors: Ben Schuster, Minneapolis, MN (US); Susan Yang, Minneapolis, MN (US); Elizabeth Feist, Minneapolis, MN (US); Clayton Black, Minneapolis, MN (US); Matthew Fevold, Minneapolis, MN (US); Andrew Wipf, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 107 days.

(21) Appl. No.: 17/958,909

(22) Filed: Oct. 3, 2022

(65) Prior Publication Data

US 2023/0123686 A1 Apr. 20, 2023

Related U.S. Application Data

(60) Provisional application No. 63/257,435, filed on Oct. 19, 2021.

(51) Int. Cl.
*G06Q 30/0201* (2023.01)
*G06Q 30/06* (2023.01)

(52) U.S. Cl.
CPC ......... *G06Q 30/0201* (2013.01); *G06Q 30/06* (2013.01)

(58) Field of Classification Search
CPC ............................ G06Q 30/0201; G06Q 30/06
USPC ........................................................ 705/7.29
See application file for complete search history.

(56) References Cited

U.S. PATENT DOCUMENTS

| 8,140,379 | B2* | 3/2012 | Anand | G06Q 30/0241 |
| | | | | 705/7.31 |
| 8,612,278 | B1* | 12/2013 | Ashley, Jr. | H04W 4/80 |
| | | | | 705/7.11 |
| 8,768,867 | B1* | 7/2014 | Thaeler | G06Q 30/02 |
| | | | | 706/12 |
| 9,875,481 | B2* | 1/2018 | Pradhan | G06Q 10/063118 |

(Continued)

FOREIGN PATENT DOCUMENTS

JP 2022063338 A * 4/2022

OTHER PUBLICATIONS

CNBC.com [online], "This Google Maps trick can save you tons of time," Aug. 2018, retrieved on Oct. 3, 2022, retrieved from URL<https://www.cnbc.com/2018/08/04/google-maps-popular-times-shows-you-wait-times.html>, 4 pages.

*Primary Examiner* — Abdallah A El-Hage Hassan
(74) *Attorney, Agent, or Firm* — Barnes & Thornburg LLP

(57) ABSTRACT

In one implementation, a method for determining accurate store traffic levels includes receiving, at a computer system, historical store data for a physical store that was generated by internal data sources located within the physical store; generating, by the computer system, a historical store model that correlates values from store data with guest traffic levels within the physical store; receiving, by the computer system, current store data from one or more of the internal data sources; determining, by the computer system, current guest traffic level in the physical store based on the current store data and the historical store model; and outputting, by the computer system, the current guest traffic level in the physical store.

20 Claims, 6 Drawing Sheets

(56) References Cited

U.S. PATENT DOCUMENTS

| | | |
|---|---|---|
| 10,325,294 B2 | 6/2019 | Pugh et al. |
| 10,462,621 B2 | 10/2019 | Rowe et al. |
| 2016/0162910 A1* | 6/2016 | Pradhan ............. G06Q 30/0201 |
| | | 705/7.23 |
| 2020/0334696 A1* | 10/2020 | Ansari ................... H04W 4/33 |

* cited by examiner

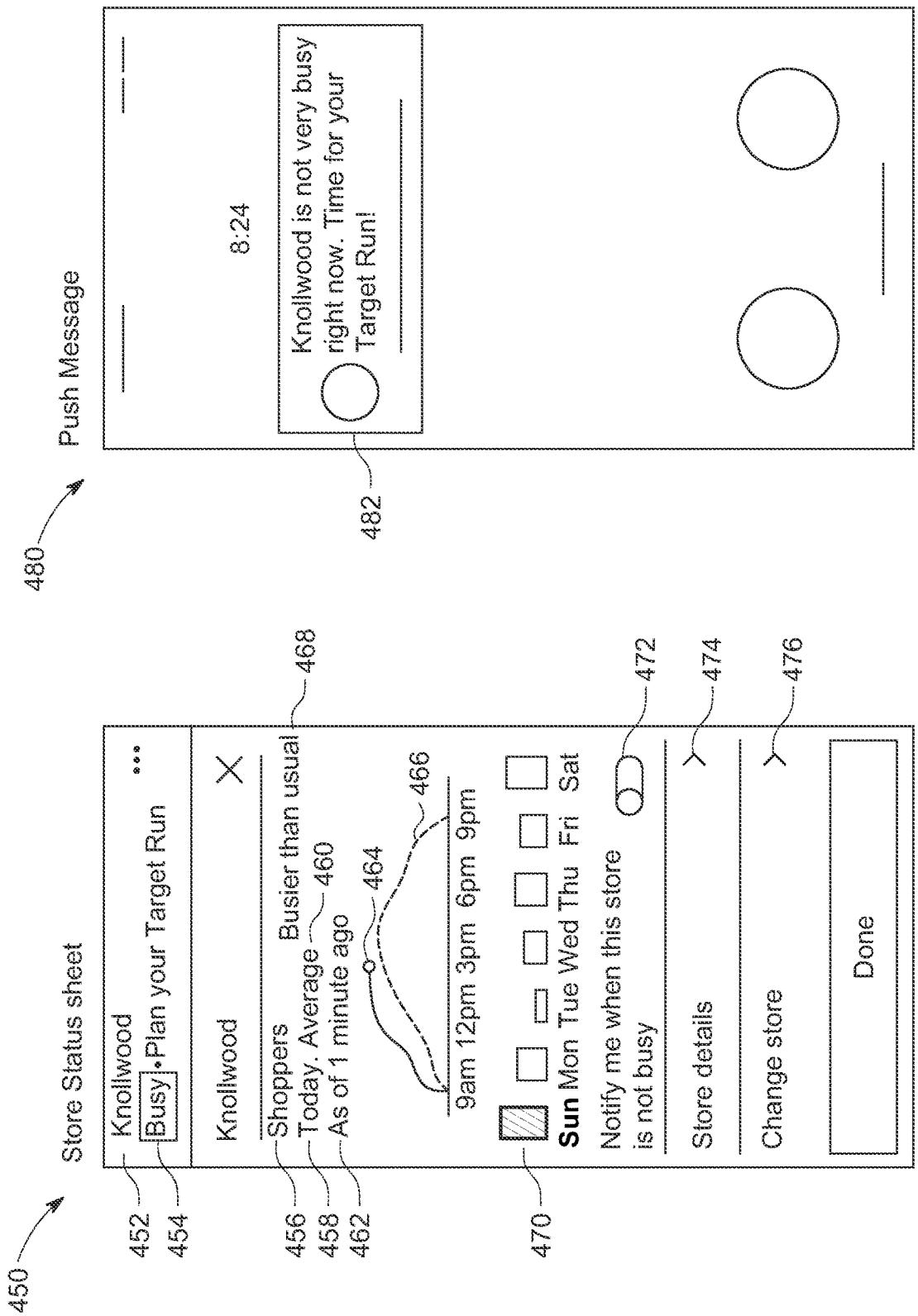

STORE TRAFFIC INDICATOR

INCORPORATION BY REFERENCE

This application claims priority to U.S. Provisional Application Ser. No. 63/257,435, filed on Oct. 19, 2021, the disclosure of which is incorporated by reference in its entirety.

TECHNICAL FIELD

This document generally relates to technology for in-store data analysis to determine a current guest count and a relative level of traffic and to predict future guest counts and relative levels of traffic at the store.

BACKGROUND

Stores, such as retail stores, typically have limited physical space within which guests can move around the stores, such as aisles containing goods that are available for purchase, checkout lanes to complete purchases, and doors to enter/exit the stores. Traffic levels for guests in stores—meaning levels of crowding within stores based on a number of guests relative to the amount of physical space within the stores—can vary over time. Traffic levels at a store may vary depending on the time of day, the day of the week, and the presence of special occasions and/or events in the store (e.g., sales, promotions, holidays). For example, traffic levels in a store may typically be lower during the middle of the day and greater in the evening, and may be typically be lower on a Monday than on a Saturday. Such traffic level variance can sometimes be predictable for guests, such as during traditionally busy store times (e.g., "Black Friday"), and other times may be unpredictable (e.g., sudden increase in traffic level for store in middle of day).

SUMMARY

This document generally describes technology for more accurately and efficiently determining levels of traffic in physical retail locations and providing this information to guests to allow them to make informed decisions regarding when and where they would like to shop. The current health crisis has highlighted customers' preferences for being able to make informed decisions regarding when and how they would like to shop. Furthermore, conventionally guests have not been able to obtain accurate store traffic information without physically arriving at and/or entering a retail store, which, in the event the store is busier than the guest's comfort level, can leave the guest with the unenviable position of either wasting a trip to the store (i.e., heading back home without shopping) or entering the store while feeling uncomfortable/unsafe. Providing accurate store traffic information to a guest provides the guest with more control over their shopping experience, and allows guests to feel more safe and at ease while visiting stores, to more effectively and efficiently plan store trips that are well within their comfort level, and create a positive association with the locations and stores that offer this feature.

Determining the number of guests currently within a store or a future number of guests has often been performed for the benefit of the stores and employees in order to assist with planning and staffing. It generally involves performing manual counts of guests as they enter the store, and may not be accurate. Furthermore, such counts would be labor intensive for an employee to perform. Other techniques use proxy metrics to supplement the model's predictions or instead of using manual counts. However, the accuracy of these proxy metrics and the extent to which the proxy metrics can be relied upon may vary and may not be applicable across different store brands, or even across different locations of the same brand.

Some techniques have relied upon single sources of data that attempt to replace the manual counting performed by employees. For example, some techniques use cameras to perform image recognition and count the number of guests that enter and leave. However, such systems can fail to account for variations in the amount of time that a guest spends shopping or checking out, or report wildly inaccurate counts in the event that the single camera stops functioning properly, leading to poor data quality and potentially negative experiences for everyone relying on the accuracy of this data.

The disclosed technology can provide for more frequent and accurate traffic condition estimation, and furthermore providing this information to guests in addition to the retail location itself and employees over manual counting and prediction methods. For example, the disclosed technology can include a system that maintains and continually updates a store traffic model. The model receives input from various sources, such as existing camera systems installed within a store, manually collected data from store employees, historical data, store attributes, and transaction data (i.e., transaction data collected from sources such as point-of-sale devices at checkout in a retail location), which can be used to update store traffic models.

The disclosed technology analyzes in-store data using guest traffic models to determine current store traffic levels. The system can use in-store data, such as guest checkout data, historical transaction data, and camera input, and combine that in-store data with historical models that correlate the in-store data with guest traffic levels in particular stores to determine current guest traffic levels for stores. For example, a historical model can correlate transaction data (e.g., quantity of checkout transactions during a period of time, number of guests per transaction during a period of time, and/or combinations thereof) with guest volume within the store at various times and days, and then current transaction data can be fed into the model to accurately determine current guest volume within the store without having to perform the more challenging/difficult computational task of identifying individual guests within the store, or continue reporting accurate guest volume in the event that either data source ceases to function. Historical models can be generated, for example, by correlating video analysis of guest traffic levels with transaction data at various times and days for a store, which can be used to model a number of guests, a number of transactions, and/or a number of guests per transaction during various time and days for the store. Current guest traffic levels can be determined based on historical models and current store data (e.g., store video data, store transaction data), and can be made available to guests to allow the guests to make informed decisions regarding their shopping experience. The system can provide a forecast as well as live updates to users based on similar days and conditions for the particular time that the user is checking, and provides some historical data as well, such as how busy the store was on a particular day as determined based on data from that day.

The disclosed system includes a monitoring system that uses historical guest traffic models and that is integrated with existing systems to determine current guest levels, allowing the system to be tuned and adapted to the infrastructure available to each store. The system uses data sources that remain the same across different locations, such as checkout/transaction data, and supplements the data with signals such as camera data and store-specific statistics. By using multiple sources of input as well as historical data, the system provides a robust method for determining in-store traffic that can seamlessly adapt when one particular source of data is unavailable, or in stores where one particular source of data is never available by approximating data from nearby stores with similar characteristics.

In one implementation, a method for determining accurate store traffic levels includes receiving, at a computer system, historical store data for a physical store that was generated by internal data sources located within the physical store; generating, by the computer system, a historical store model that correlates values from store data with guest traffic levels within the physical store; receiving, by the computer system, current store data from one or more of the internal data sources; determining, by the computer system, current guest traffic level in the physical store based on the current store data and the historical store model; and outputting, by the computer system, the current guest traffic level in the physical store.

Such a method can optionally include one or more of the following features. The historical store model can include sets of estimates for each of a plurality of time periods, wherein each of the sets of estimates includes an estimated number of transactions in the physical store for a time period and an estimated number of guests per transactions during the time period. The current store data can include a number of transactions during a current time period. Determining the current guest traffic level can include accessing a current set of estimates for the current time period from the historical store model, the current set of estimates including a current estimated number of transactions and a current estimated number of guests per transaction for the current time period. Determining a current number of guests in the physical store can be based on the number of transactions and the estimated number of guests per transaction. Determining the current guest traffic level can be based on the current number of guests. The current guest traffic level can include a deviation of the current guest traffic level from an estimated guest traffic level for the current time period. The estimated guest traffic level can be determined based on the current estimated number of transactions and the current estimated number of guests per transaction for the current time period. The deviation can include a percentage of the current guest traffic level against the estimated guest traffic level. The current guest traffic level can include a deviation of the current guest traffic level from an estimated maximum guest traffic level for an upcoming time window. The estimated maximum guest traffic level can be for a selected time period within the upcoming time window that is determined to have a greatest estimated number of guests. The deviation can include a percentage of the current guest traffic level against the estimated maximum guest traffic level. The current guest traffic level can include the current number of guests.

The systems, devices, program products, and processes described throughout this document can, in some instances, provide one or more of the following advantages. For example, the disclosed technology can more accurately generate store traffic information, forecast store traffic levels, and provide actionable guidance to guests. Additionally, the disclosed technology can be integrated with existing in-store processes and systems without requiring any additional equipment to generate accurate traffic information. The disclosed technology can, additionally, generate accurate traffic information in a manner that is resilient and robust due to the variety of sources from which data can be pulled—permitting for seamlessly switching between data sources while still providing accurate predictions of in-store traffic. Additionally, the disclosed technology can provide this store traffic information to guests to enable guests to make informed decisions that allow them to better plan their store trips within their comfort level and to feel more safe during their shopping experience.

In another example, the disclosed technology can provide additional data accuracy, which can benefit a variety of additional groups and/or decisions within a retail organization, such as labor and staffing standards that are used in stores, and merchandising business decisions that utilize traditional traffic forecasting to plan workload and merchandise.

In a further example, the disclosed technology can provide generate store traffic information, forecast store traffic levels, and provide actionable guidance to guests in ways that accurately represents the relative business of a retail store, but in a manner that does not expose any confidential, private, or proprietary data that the organization cannot allow to be revealed (e.g., made public), such as real-time sales statistics. The disclosed technology can sufficiently obfuscate and detach the underlying sensitive data and information, such as real-time sales statistics, from the output that is presented publicly so as to alleviate concerns that the public information may potentially and indirectly divulge the sensitive data.

DESCRIPTION OF DRAWINGS

FIGS. 4A-D show example configurations of a user interface for displaying in-store guest traffic data to guests of a store.

Like reference symbols in the various drawings indicate like elements

DETAILED DESCRIPTION

As described above, this document describes technology for generating and updating a model of in-store guest traffic data by using historical guest traffic models and that is integrated with existing systems to determine current guest levels and provide this data to guests through an easily digestible and accessible interface.

Figure 1:
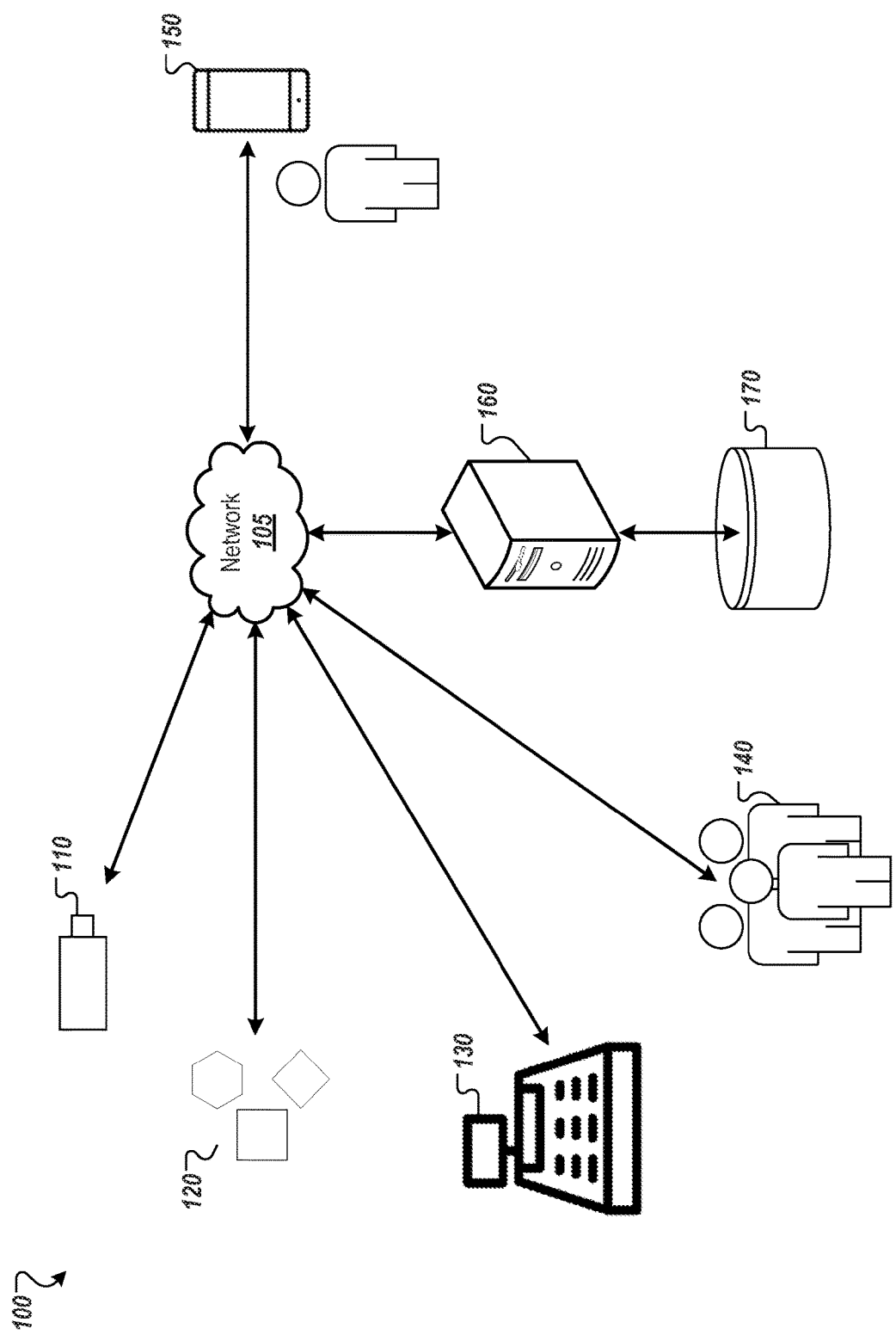
FIG. 1 shows an example system for generating and updating a model of in-store guest traffic data using variety of data sources, including transaction data.
Figure 2:
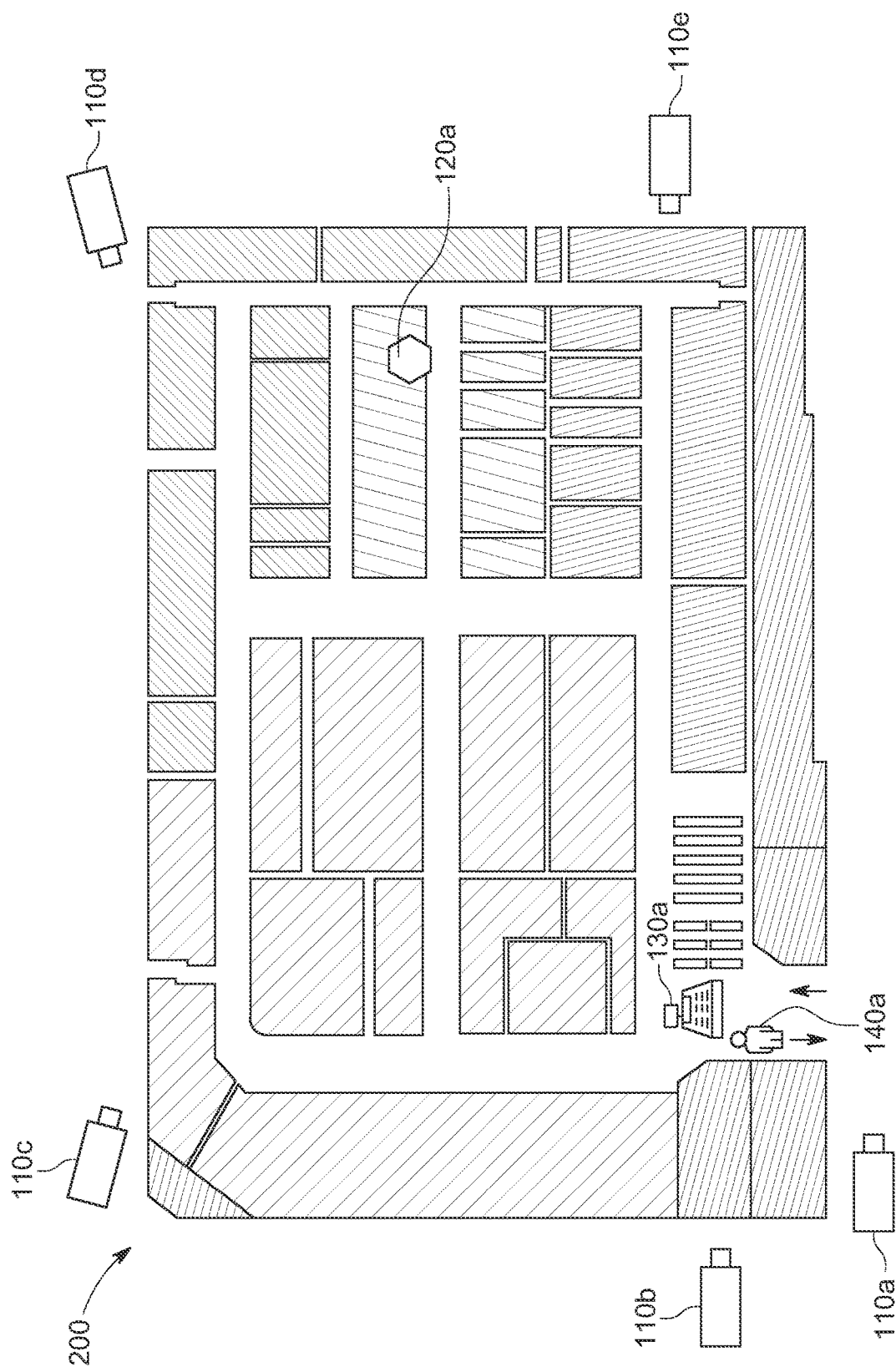
FIG. 2 depicts an example overhead camera view of a store and various data sources used by the system of FIG. 1.

FIG. 1 shows example system 100 for generating and updating a model of in-store guest traffic data using variety of data sources, including transaction data. System 100 includes data sources such as cameras 110, sensors 120, point-of-sale (POS) systems 130, employees 140, user devices 150, and data store 170. FIG. 2 depicts an example overhead camera view 200 of a store and various data sources used by the system 100 of FIG. 1. System 100 also includes a server 160 that performs analysis of the data from the various data sources. System 100 includes a network 105 such as a local area network (LAN), a wide area network (WAN), the Internet, a mobile network, or a combination thereof. The network 105 connects each of the data sources with the server 160.

Cameras 110 can include cameras of various resolution and image quality. For example, cameras 110 can include low resolution cameras and high resolution cameras that can collect image data from the surrounding environment and transmit that image data to the server 160 and/or data store 170. The low resolution cameras can include hardware, firmware, and software capable of capturing images that produce less data (e.g., lower resolutions, at a lower framerate, and/or with fewer color) than the high resolution cameras.

System 100 can be implemented using the existing sensing and surveilling system within a store, and therefore the quality of cameras 110 can vary from store to store. The quality of each camera can be stored, for example, in store attribute data that is accessible by server 160 as described in further detail below.

For example, cameras 110 can include a front door camera 110a as depicted in FIG. 2, that monitors guest traffic flow into and out of the store. Front door camera 110a can collect visual data of guests entering and exiting the store and provide the visual data to, for example, server 160 for analysis. For example, server 160 can process the image data provided by front door camera 110a to detect and identify guests who are entering and leaving to keep an accurate count of the number of guests inside of the store at any point in time.

Cameras 110 can include, for example, normal security cameras 110c, 110d, and 110e as depicted in FIG. 2. Each of cameras 110c, 110d, and 110e can be cameras that are already installed and in place for the store. For example, system 100 can be integrated with an existing camera system within a store, and does not require the installation of higher quality cameras.

Cameras 110 can include camera(s) 110b that surveil the checkout lanes and/or the POS systems 130. For example, camera 110b can provide image and/or video data of the checkout lanes in a store and/or the POS systems 130. Server 160 can use this information to determine various metrics and parameters, such as the amount of time that guests spend at checkout, the average number of items being purchased, the type of payment used, among other parameters.

Sensors 120 can include, for example, sensor 120a as depicted in FIG. 2. Sensors 120 can include motion sensors, heat sensors, pressure sensors, resistive sensors, etc. Sensors may communicate with server 160 and transmit monitoring data for processing. Sensors located on at the store may store collected data locally or transmit monitoring data to be stored in a remote location. In one example, sensor 120a is a motion sensor that turns on the light in a display case for a freezer, and sensor 120a is able to detect and record times at which motion has been detected.

Point-of-sale system(s) 130 can include, for example, POS system 130a as depicted in FIG. 2. POS system 130 is a system through which transactions, such as sales and returns can be performed. POS system 130 can calculate the amount owed by the guest for a purchase, calculates an amount to be refunded to the guest for a return, prepares an invoice for the guest, indicates options for payment or refund, allows the guest to either make a payment or receive a refund, and generates a receipt either to be printed out or otherwise provided to the guest, among other operations.

Employees 140 can include, for example, employee 140a at the front door of the store as depicted in FIG. 2. Employees 140 are employees of the store who collect various data while performing their duties at the store. For example, employee 140a can be an employee who welcomes guests into the store, counts guests as they enter the store and decrements the number of guests as guests leave the store, and performs other duties, such as ensuring that guests are following any applicable regulations, laws, and store policies.

User devices 150 can be electronic devices capable of requesting and receiving resources (e.g., electronic documents) over the network 105. Example user devices 106 include personal computers, mobile communication devices, and other devices that can send and receive data over the network 105. A user device 150 typically includes a user application, such as a web browser, to facilitate the sending and receiving of data over the network 105. Additionally, user device 150 may include native applications that also facilitate the sending and receiving of data over the network 105. For example, the described systems and methods can be implemented through a dedicated application on user device 150 and/or a user interface accessible through a web browser.

Server 160 is a computing system that performs various computing processes, including pulling and analyzing data from various sources, generating and updating a store traffic model, and generating and updating a graphical user interface that provides store traffic model data to a guest of a particular store.

Data store 170 can be, for example, a database that stores historical and current data for analysis by server 160. In some implementations, server 160 can pull data from data store 170. Data store 170 can also push data on a schedule, or when new data is stored, to server 160.

For example, data store 170 can store historical store transaction data. This historical data includes, for example, quantities, types, prices, checkout time, etc. of items purchased during a transaction. In some implementations, the transaction data includes data indicating transactions other than purchases, including returns, credits, generating invoices, creating accounts, etc.

Figure 3:
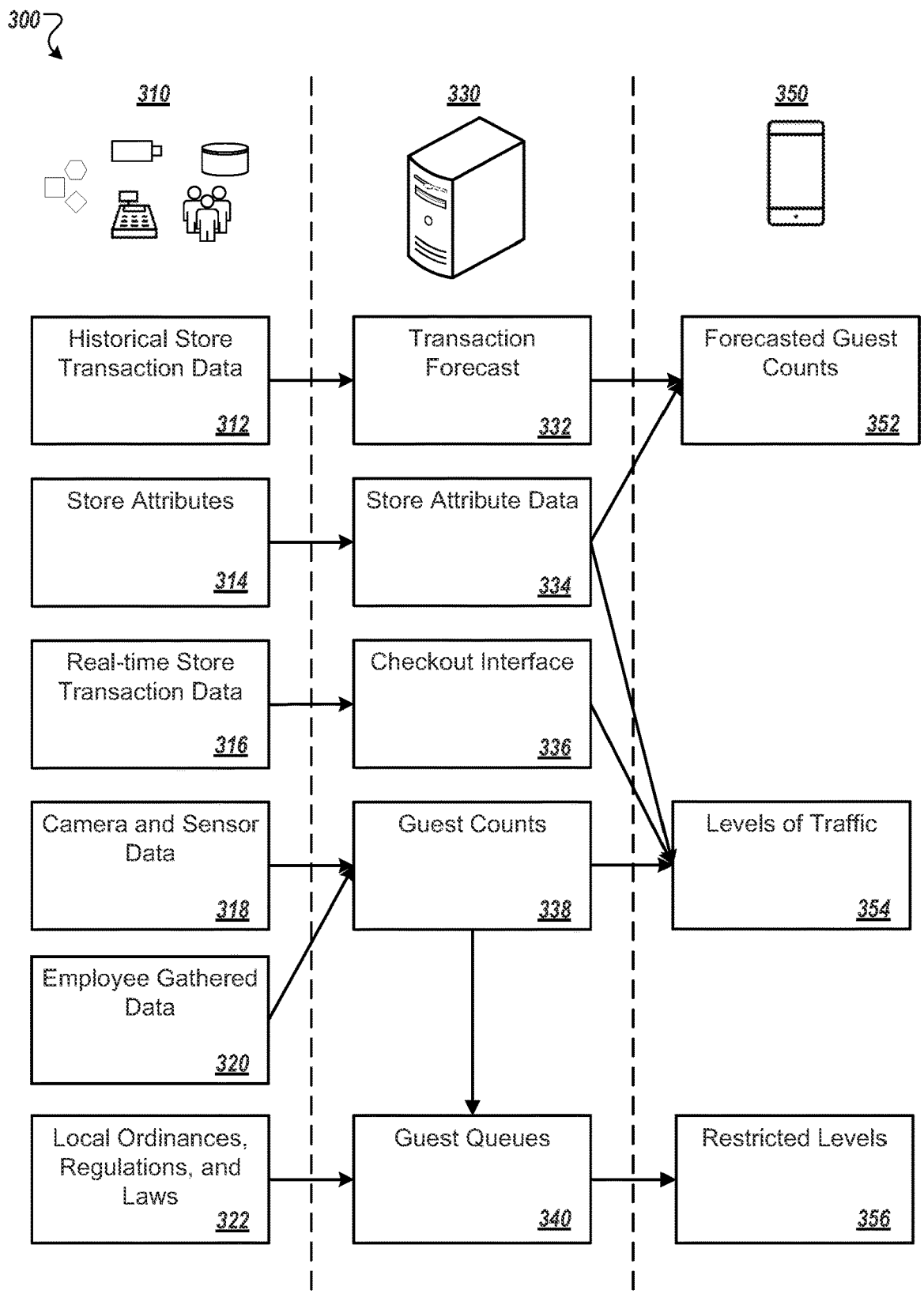
FIG. 3 shows a data flow diagram of an example process for generating and updating a model of in-store guest traffic data.

FIG. 3 shows a data flow diagram of an example process 300 for generating and updating a model of in-store guest traffic data. The process 300 is performed by data sources 310, server 330, and user device 350. Data sources 310 can include sources such as cameras 110, sensors 120, POS systems 130, employees 140, and data store 170 as described above with respect to FIGS. 1-2. Server 330 can be an implementation of server 160 as described above with respect to FIGS. 1-2. User device 350 can be an implementation of user device 150 as described above with respect to FIGS. 1-2.

Historical store transaction data 312 includes transaction data from the store gathered over a period of time prior to the current time. For example, historical store transaction data 312 can include transaction data gathered by the POS systems 130 in a store at least one day before the current day. POS systems 130 can store the data in data store 170 or provide the data directly to server 330. For example, server 330 can request the historical store transaction data 312 from POS systems 130 or data store 170. POS systems 130 or data store 170 can push historical store transaction data 312 to server 330. Historical store transaction data 312 can be used to generate transaction forecast model 332.

Transactions of any size are considered as separate transactions. For example, a transaction involving the purchase of a single item is considered a single transaction, just as the purchase of 20 items is considered a single transaction. In some implementations, server 330 is able to use additional data, such as store attributes 314, camera and sensor data 318, and employee gathered data 320, among other data, to determine whether a number of different transactions are being performed by a single guest. For example, if a guest performed an exchange transaction, which may be processed as a return of one item and a purchase of a different item, server 330 may consider the exchange transaction to be a single transaction. In another example, if a guest performed multiple successive purchase transactions, server 330 may be able to use historical transaction data 314 to determine that, based on the use of a single payment method across the successive purchase transactions, each of the multiple transactions was performed by the same guest.

Store attributes 314 include, for example, attributes such as size (e.g., square footage), population density of the surrounding area, distance to other stores that offer similar products, among other attributes. Store attributes 314 include data specific to the particular store for which system 100 as described above with respect to FIGS. 1-2 is implemented. Store attributes 314 can be pulled from stores, such as data store 170 or store attribute data 334. In some implementations, store attributes 314 can be provided by employees of each store and stored in a separate data store. In some implementations, store attributes 314 can be gathered by server 330 through sources such as a central database or a public network. For example, server 330 may be able to identify certain store attributes from the store's website and update the store attributes 314.

Real-time store transaction data 316 includes current transaction data from the store. For example, real-time store transaction data 316 can include transaction data gathered by the POS systems 130 in a store as the transactions are being performed. POS systems 130 can store the data in data store 170 or provide the data directly to server 330. For example, server 330 can request the real-time store transaction data 316 from POS systems 130 or data store 170 at a regular interval such as every 15 minutes. POS systems 130 or data store 170 can push real-time store transaction data 316 to server 330.

For example, POS system 130 can push real-time store transaction data 316 to server 330 as soon as each transaction is performed. Real-time store transaction data 316 can be used as input to a checkout interface 336, which is connected to POS systems, such as POS systems 130.

Camera and sensor data 318 includes visual data gathered by various cameras around a store and other sensor data gathered by sensors around a store. For example, camera and sensor data 318 can include visual data gathered by front door camera 110*a* that can be used to generate an estimate of the number of guests in the store. Camera and sensor data 318 can be used to determine guest counts 338 (e.g., a number of guests in the store, at checkout, or in a particular department of the store, etc.)

For example, server 330 can process the image data provided by front door camera 110*a* to detect and identify individual guests to keep an accurate count of the number of guests inside of the store at any point in time. However, performing this image recognition and differentiation process can be extremely resource intensive while providing only marginal benefits over a less precise method. Additionally, the accuracy of this method of counting guests depends on the quality of camera and sensor data 318 (e.g., the image quality that can be obtained by the cameras 110). In some implementations, server 330 uses the image data to simply detect whether guests are leaving or entering and decrementing or incrementing a guest count, respectively. Server 330 can differentiate between employees 140 and guests.

Camera and sensor data 318 can include, for example, motion sensor data from sensors 120 as described above with respect to FIGS. 1-2. For example, a motion sensor 120 that triggers a light in a display case in the freezer section of a store can detect and record how often and it detects motion. This motion sensor data can also be used as an input to estimate and forecast the number of guests in the store.

Employee gathered data 320 includes manual guest counts performed by employees, such as employees 140. For example, employees 140 can manually keep a count of the number of guests in the store, the number of guests at checkout, the number of guests in a particular department of the store, etc. Employee gathered data 320 can be used to determine guest counts 338 (e.g., a number of guests in the store, at checkout, or in a particular department of the store, etc.)

Additionally, local ordinances, regulations, and laws 322 can be gathered and updated on a regular or as-needed basis to ensure that any necessary guidelines and laws are followed. For example, local ordinances, regulations, and laws 322 can dictate the occupancy of the store, the hours until which the store can be open, whether particular guests, such as guests over 65, are to be given preference for entering the store, etc.

Local ordinances, regulations, and laws 322 can be used to generate guest queue data 340, which indicates a current level of guest queueing and/or a level of guest queueing which is allowed under the local ordinances, regulations, and laws 322. Server 330 can account for local ordinances, regulations, laws to be fully compliant with any safety regulations, etc. in any of its calculations, as well as display times when customers would be expected to wait additional time in a queue and be encouraged to consider alternative times to shop and avoid an extra wait.

All of the information used by server 330 can be refreshed on a regular schedule. In some implementations, server can pull data from data store 170 or other storage locations. In some implementations, the data sources 310 can report data to server 330 as new data is collected or on a periodic basis.

Using the historical store transaction data 312, server 330 can generate and update a transaction forecast model 332 that predicts a future level of traffic in the store. For example, transaction forecast model 332 can be used as an input to generate forecasted guest counts 352.

Server 330 uses transaction data as a proxy metric for the number of guests in the store. For example, server 330 can correlate the number of guests to the number of transactions being performed at the particular store, determine the transaction rates and rates of guests entering and leaving the store to generate a function relating the transaction rate to the number of guests and/or relative level of traffic.

Server 330 can use the output of the transaction forecast model 332 and the store attribute data 334 to generate a forecasted guest count 352, which is then displayed to a guest through a user interface presented through user device 350. The forecasted guest count 352 can be for a particular period of time as specified by the server 330. For example, the forecasted guest count 352 can be for a particular hour of a particular day, or for a particular day of the week. In some implementations, the forecasted guest counts 352 are used to determine traffic levels 354. For example, forecasted guest counts 352 can, either alone or in combination with other data (e.g., transaction data 316, guest counts 338), be used to determine how busy a store is relative to their previous levels of traffic 354.

Server 330 can use forecasted guest counts 352 based on the historical store transaction data 312 as the basis for the determination of the level of traffic 354. For example, the forecasted guest counts 352 can include information forecasting a number of guests per transaction and a number of transactions that are expected, based on historic data, for a particular store during every periodic time interval (e.g., 5 minutes, 15 minutes, 30 minutes, 1 hour) for an upcoming time window (e.g., next 6 hours, next 12 hours, next day, next week). The number of guests per transaction and the number of transactions that are expected can vary across each of these time intervals, and can be used to provide a prospective forecast for guests of traffic levels over the time window (i.e., multiply expected number of transactions by expected number of guests per transaction), and can also be used to provide estimates of current guest traffic levels when other data sources are not available. This information can be combined with real-time information, thought, to further improve current guest traffic levels, such as the store transaction data 316 and/or the guest counts 338. For example, the current number of transactions derived from the store transaction data 316 can be multiplied against the estimated number of guests per transaction to determine the current guest traffic level, which can then be compared against the expected guest traffic level to determine whether things are busier, less busy, or about the same as originally projected. In another example, the server 330 can adjust the estimate based on other sources of data 310, such as the camera and sensor data 318 and/or used to float the forecasted guest counts 352 upward or downward based on the additional data sources.

When generating a forecasted guest count, such as forecasted guest counts 352, server 330 can include a level of confidence in the forecasted number of guests, which is informed based on historical forecasts and actual historical guest counts and transaction data 312.

For example, server 330 can use current guest counts 338 (generated based on camera and sensor data 318 and employee gathered data 320) as an input to determine traffic levels 354. The current guest counts 338 can be provided as input to determine guest queueing level 340.

The system 100 is particularly failure tolerant because server 330 can seamlessly switch to other data sources to provide continuous service by providing estimates of the forecasted guest counts 352 even in situations in which one or more of the data sources 310 are unavailable or have become unreliable. Server 330 is able to compensate for the loss of one data source by using a different data source, and can, for example, use different combinations of data sources for different stores, locations, and/or brands.

There is usually a period of lag time between when a guest enters the store and when the guest either leaves or checks out. Based on the historical store transaction data 312, server 330 can determine an appropriate period of time to offset particular input variables (e.g., camera and sensor input 318, employee gathered data 320, guest counts 338, transaction forecasts 332) when determining forecasted guest counts 352. For example, server 330 can determine that the average time between a guest entering a store and a guest making a transaction is 20 minutes, and therefore the manual guest count determined by employees (employee gathered data 320) is offset by 20 minutes prior to being considered as a variable for forecasted guest counts 352 or traffic levels 354.

Server 330 can perform various operations to adjust the forecasting and estimation models. For example, if server 330 receives new input data for the transaction forecast model 332 on a fixed schedule, such as every 6 minutes, server 330 can average an hour's worth of guest counts together to smooth out an estimate of the forecasted guest counts 352.

Server 330 can generate a simple and intuitive presentation of the estimation model data by presenting the data in a graph. In one example, server 330 can use a forecast of a period of time in the future, such as 7 days, to determine a peak hour or day at which the number of guests is highest and use that number of guests as the maximum number of guests and represent all other values (i.e., number of guests on a particular day or at a particular hour) as a percentage of this maximum number of guests.

By representing forecasted guest counts and/or traffic as a percentage of a maximum value, server 330 is adaptable to a system in which the maximum can fluctuate over time and a user is still able to determine, at a glance, whether the store is busy relative to recent levels of traffic.

Additionally, server 330 determines a level of traffic relative to the store's own traffic levels or uses a running average of the traffic levels to ground the forecasted estimate even with shifting levels of store traffic within a period of time.

FIGS. 4A-D show example configurations of user interfaces for displaying in-store guest traffic data to guests of a store.

Figure 4A:
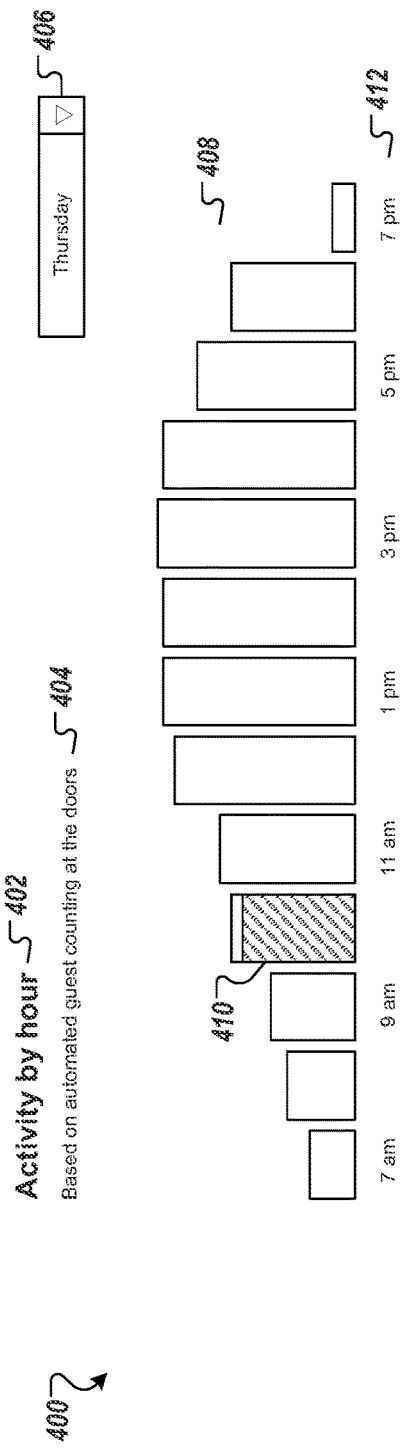
Figure 4B:

FIGS. 4A and 4B depict an example configuration of user interfaces 400 or 420 for displaying in-store guest traffic to guests of a store as a relative, graphical representation.

FIG. 4A depicts an example configuration of user interface 400 which displays the forecasted level of traffic (e.g., levels of traffic 354) as a graph showing a relative level of traffic at each hour of operation of a particular store.

FIG. 4B depicts an example configuration of user interface 420 which displays the forecasted level of traffic (e.g., levels of traffic 354) as a graph showing a relative level of traffic for each day that the particular store is open.

Titles 402 and 422 indicate the data being presented in the user interfaces 400 and 420. For example, with respect to FIG. 4A and user interface 400, title 402 indicates that the data being represented in user interface 400 is the forecasted traffic level by the hour. With respect to FIG. 4B and user interface 420, title 422 indicates that the data being represented in user interface 420 is the forecasted traffic level by the day.

Indications 404 and 424 indicate the source of the data. For example, with respect to FIG. 4A and user interface 400, indication 404 indicates that the data being represented in user interface 400 is based on automated guest counting at the doors (e.g., employee gathered data 320). With respect to FIG. 4B and user interface 420, indication 424 indicates that the data being represented in user interface 420 is based on historical transaction data (e.g., historical store transaction data 312).

Graphical data 408 and 428 are graphical representations of the forecasted traffic level. For example, with respect to FIG. 4A and user interface 400, graphical data 408 indicates the forecasted traffic level in user interface 400 (e.g., traffic level 354). For example, with respect to FIG. 4B and user interface 420, graphical data 428 indicates the forecasted traffic level in user interface 420 (e.g., traffic level 354).

Labels 412 and 432 indicate the time and/or time period for which the traffic levels 354 are determined. For example, with respect to FIG. 4A and user interface 400, label 412 indicates the hours of operation for the particular store and labels each one of the forecasted traffic levels 354 with the corresponding hour. With respect to FIG. 4B and user interface 420, label 432 indicates the hours of operation for the particular store (e.g., from 7 a.m. to 7 p.m.) and labels each one of the forecasted traffic levels 354 with the corresponding day.

With respect to user interfaces 400 and 420, cross-hatched bars 410 and 430 indicate that the data being displayed is, for example, live, real-time data that is currently being collected.

With respect to user interface 400, user interface element 406 allows a user presented with user interface 400 to provide input to make a change to user interface 400 and the data being displayed. For example, user interface element 406 allows a guest presented with user interface 400 to make a selection of a different day for the hour-by-hour data being displayed. The current hour-by-hour data being displayed in user interface 400 is for Thursday.

FIGS. 4C and 4D display example user interfaces 450 and 480 for displaying in-store guest traffic to guests of a store as a relative, graphical representation.

FIG. 4C displays an example user interface 450 for displaying in-store guest traffic information, store information, and other useful information to a guest of a store.

Store name 452 indicates the name of the store. Store name 452 indicates the unique name of the store if the store not part of a chain. If, for example, the store is part of a chain or has multiple different locations, store name 452 can indicate the location of the particular store. With respect to example user interface 450, the store name 452 indicates that the particular store is in "Example City A."

Store status indication 454 indicates the current state of the store with respect to the metric being displayed and indicated by title 456. For example, with respect to example user interface 450, the store status indication 454 is "Busy" for the "Example City A" store.

Title 456 indicates that the data being shown is the number of shoppers at Example City A store. Here, the status as indicated by store status indication 454 is "Busy" with respect to the number of shoppers at the Example City A store.

Label 458 corresponds to graphical representation 464. With respect to example user interface 450, label 458 indicates that the data being displayed by graphical representation 464 is the number of shoppers for the time period of the current day (i.e., today).

Label 460 corresponds to graphical representation 466. With respect to example user interface 450, label 460 indicates that the data being displayed by graphical representation 466 is the average number of shoppers over a predetermined time period.

As indicated by store status indication 454 and visible from comparison of graphical representations 464 and 466, today's number of shoppers is greater than the average number of shoppers. Relative status 468 indicates the status of the store as determined based on a comparison of the data being displayed by graphical representations 464 and 466. With respect to example user interface 450, relative status 468 indicates that, relative to the average, the store is "Busier than usual" based on the number of shoppers.

Last data pull 462 indicates when the data was last refreshed. For example, last data pull 462 can represent when the data was last retrieved or received by server 330 as described with respect to FIG. 3. With respect to example user interface 450, last data pull 462 shows a message that the data is current "As of 1 minute ago."

Graphical representation 470 is similar to graphical representation 428, and displays the data as discrete values for each day, relative to a maximum as determined over the period of the 7 days shown.

User interface element 472 allows a guest presented with user interface 450 to select an option with respect to being notified. In this particular example, user interface element 472 allows a guest presented with user interface 450 to toggle whether to be notified when the store is not busy. If, for example, the guest wishes to be notified when the store is not busy, user interface 480 can be presented to the guest.

User interface element 474 allows a guest presented with user interface 450 to see more store details. For example, user interface element 474 can display store attributes 314 or store attribute data 334 as described above with respect to FIG. 3.

User interface element 476 allows a guest presented with user interface 450 to change the store (represented by store name 452). For example, user interface element 476 allows a guest to choose a different store if the current store is a standalone store, or a different location if the current store is part of a chain or has other locations. In some implementations, user interface element 476 allows a guest to type in a different store name or location.

FIG. 4D displays an example user interface 480, in which a push notification 482 has been provided to a user device that provides information regarding the traffic level of a store. For example, push notification 482 indicates that the store indicated in user interface 450 is not currently busy, and that it may be a good time for the guest being provided with the push notification 482 to make a trip to the store.

In some implementations, the system is able to learn from guest behavior with respect to the user interface to learn what features are most important to guests. The system as described above with respect to FIGS. 1-3 can generate, for example, custom options and push notifications for the guest.

Figure 5:
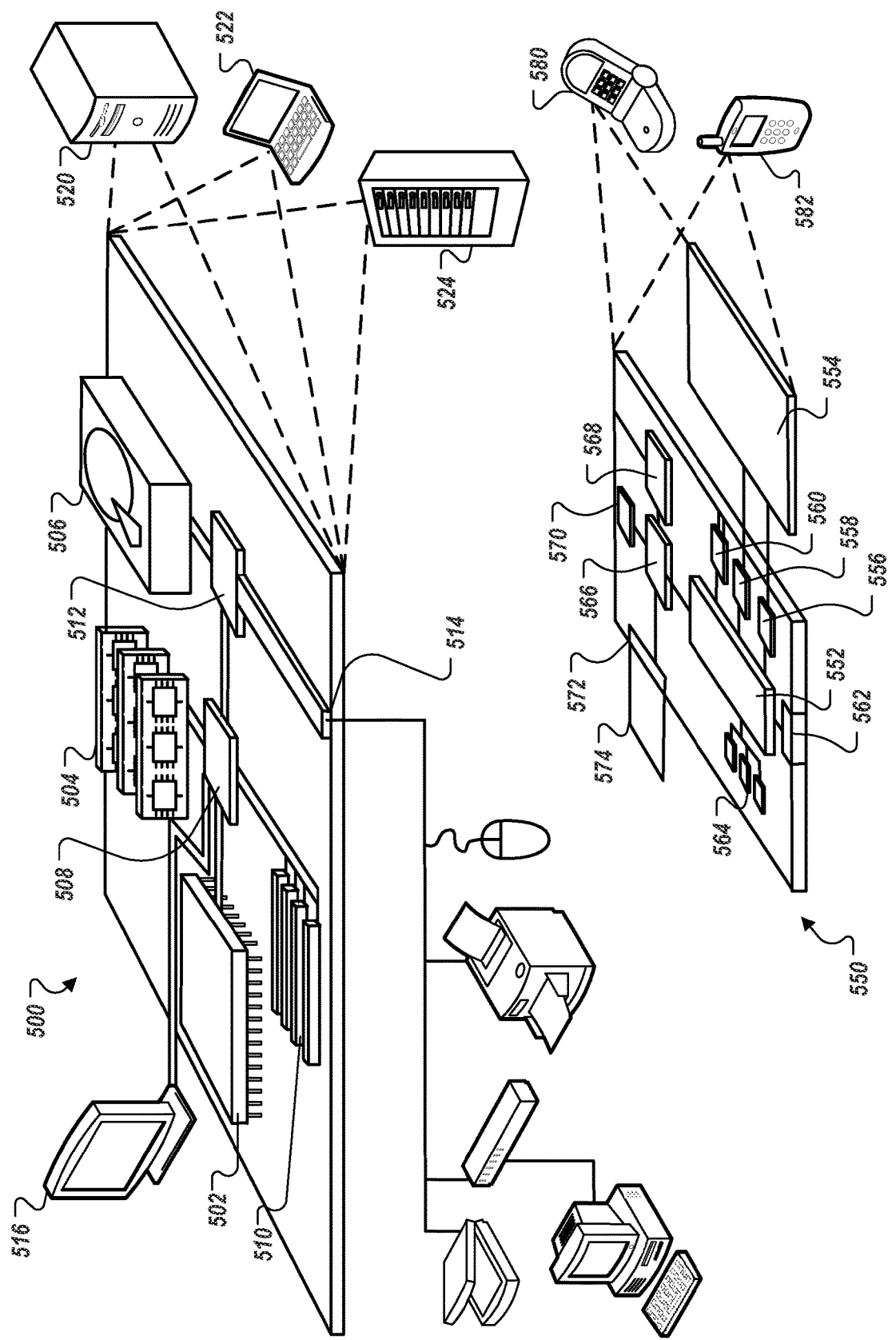
FIG. 5 is a schematic diagram that shows an example of a computing device and a mobile computing device.

FIG. 5 shows an example of a computing device 500 and an example of a mobile computing device that can be used to implement the techniques described here.

The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method for determining store traffic levels, the method comprising:
    training a store model during a pre-processing phase, wherein the training comprises:
        receiving, by a computer system from cameras positioned throughout the physical store, image data generated by the cameras;
        receiving, by the computer system from point of sale (POS) terminals positioned in a checkout area of the physical store, transaction data generated by the POS terminals;
        digitally identifying, by the computer system, guests in the image data of the physical store using image recognition techniques;
        determining, by the computer system, numbers of the guests in the physical store during one or more periods of time based on visually identifying the guests in the image data; and
        generating, by the computer system, register volume data for the one or more periods of time based on identifying, from the transaction data, frequency and quantity of transactions during the one or more period of time;
        generating and training, by the computer system, the store model to correlate the image data from the cameras with the transaction data from the POS terminals to determine current guest traffic levels in the physical store, wherein the training comprises:
            (i) correlating the determined number of guests in the physical store with the transaction data from the POS terminals during the same one or more periods of time,
            (ii) determining a transaction rate based on the transaction data from the POS terminals, and
            (iii) generating a function relating the transaction rate to the number of guests;
    determining a current guest traffic level in the physical store during a runtime phase that occurs after the pre-processing phase, wherein the determining comprises:
        receiving, by the computer system from the POS terminals positioned in the checkout area of the physical store, real-time transaction data for a current period of time;

receiving, by the computer system from the cameras positioned throughout the physical store, image data captured by the cameras during the current period of time;

storing, by the computer system in a data store, the real-time transaction data and the image data for the current period of time for processing at a later time;

providing, by the computer system, the real-time transaction data as input to the store model trained during the pre-processing phase;

receiving, by the computer system and as output from the store model, the current guest traffic level in the physical store for the current period of time;

generating, by the computer system, device output data about guest traffic levels in physical stores for presentation in graphical user interface (GUI) displays of one or more guest computing devices, wherein the device output data comprises a user interface element that is selectable by a guest at the one or more guest computing devices to cause the one or more guest computing devices to request and present a current guest traffic level at a particular physical store;

returning, by the computer system to the one or more guest computing devices, the device output data, wherein the one or more guest computing devices are configured to, in response to receiving the device output data, present the user interface element in the respective GUI displays;

receiving, by the computer system from the one or more guest computing devices, guest selection of the user interface element to request and present the current guest traffic level at the particular physical store;

updating, by the computer system, the device output data to present the current guest traffic level in the particular physical store in the GUI displays of the one or more guest computing devices, wherein the updated device output data comprises (i) a graphical representation indicating average guest traffic levels over a predetermined time period for the particular physical store, (ii) a graphical element overlaying at least a portion of the graphical representation, wherein the graphical element indicates the current guest traffic level in the particular physical store for the current period of time relative to the average guest traffic levels over the predetermined time period for the particular physical store, and (iii) another user interface element that is selectable by the guest at the one or more guest computing devices to cause the one or more guest computing devices to request and present push notifications from the computer system indicating that the particular physical store is not busy;

returning, by the computer system to the one or more guest computing devices, the updated device output data about the current guest traffic level in the particular physical store, wherein the one or more guest computing devices are configured to, in response to receiving the updated device output data, update the respective GUI displays to present (i) the graphical representation, (ii) the graphical element, and (iii) the other user interface element in the respective GUI displays;

receiving, by the computer system from the one or more guest computing devices, guest selection of the other user interface element, wherein the guest selection of the other user interface element comprises a request for the push notifications from the computer system indicating that the particular physical store is not busy;

repeatedly determining, by the computer system and in response to the guest selection of the other user interface element, whether the current guest traffic level in the particular physical store is less than a threshold level;

automatically generating, by the computer system and based on a determination that the current guest traffic level is less than the threshold level, a push notification indicating that the particular physical store is not busy;

transmitting, by the computer system to the one or more guest computing devices, the push notification to cause the one or more guest computing devices to present, in the respective GUI displays, the push notification; and updating, by the computer system, the store model based on the current guest traffic level for the current period of time determined using the store model during the runtime phase, the real-time transaction data for the current period of time received during the runtime phase, and the image data for the current period of time received during the runtime phase.

2. The method of claim 1, wherein the store model is trained to generate sets of estimates for each of a plurality of time periods, wherein each of the sets of estimates includes an estimated number of transactions based on the transaction data for a time period amongst the plurality of time periods and an estimated number of guests per transaction during the time period.

3. The method of claim 2, wherein:

the real-time transaction data comprises a number of transactions that are performed at the POS terminals positioned in the checkout area of the physical store during the current period of time, wherein the store model is trained to determine the current guest traffic level based on:
generating a current set of estimates for the current period of time, the current set of estimates including a current estimated number of transactions and a current estimated number of guests per transaction for the current period of time; and
determining a current number of guests in the physical store based on correlating the number of transactions and the estimated number of guests per transaction.

4. The method of claim 3, wherein:

the current guest traffic level comprises a deviation of the current guest traffic level from an estimated guest traffic level for the current period of time, and the estimated guest traffic level is determined, by the computer system, based on the current estimated number of transactions and the current estimated number of guests per transaction for the current period of time.

5. The method of claim 4, wherein the deviation comprises a percentage of the current guest traffic level against the estimated guest traffic level.

6. The method of claim 3, wherein:

the current guest traffic level comprises a deviation of the current guest traffic level from an estimated maximum guest traffic level for an upcoming time window, and the estimated maximum guest traffic level is for a selected period of time within the upcoming time window that is determined, by the computer system, to have a greatest estimated number of guests during the upcoming time window.

7. The method of claim 6, wherein the deviation comprises a percentage of the current guest traffic level against the estimated maximum guest traffic level.

8. The method of claim 3, wherein the current guest traffic level comprises the current number of guests.

9. The method of claim 1, wherein the real-time register volume data comprises transaction data that is generated in real-time by the POS terminals in the physical store in response to guests completing purchases during respective checkout processes at the POS terminals in the checkout area of the physical store.

10. The method of claim 1, wherein, upon detection that the current guest traffic level is updated during the runtime phase, returning the information to the one or more guest computing devices comprises:
   automatically generating, by the computer system, a push notification containing information that the particular physical store is not busy; and
   transmitting, by the computer system, the push notification to the one or more guest computing devices to cause the one or more guest computing devices to present, in real-time and during the runtime phase, the push notification.

11. A method for determining store traffic levels, the method comprising:
   training a store model during a pre-processing phase, wherein the training comprises:
      receiving, by a computer system from cameras positioned throughout the physical store, image data generated by the cameras;
      receiving, by the computer system from point of sale (POS) terminals positioned in a checkout area of the physical store, transaction data generated by the POS terminals;
      digitally identifying, by the computer system, guests in the image data of the physical store using image recognition techniques;
      determining, by the computer system, numbers of the guests in the physical store during one or more periods of time based on visually identifying the guests in the image data;
      generating, by the computer system, register volume data for the one or more periods of time based on identifying, from the transaction data, frequency and quantity of transactions during the one or more period of time; and
      generating and training, by the computer system, the store model to correlate the image data from the cameras with the transaction data from the POS terminals to determine current guest traffic levels in the physical store, wherein the training comprises:
         (i) correlating the determined number of guests in the physical store with the transaction data from the POS terminals during the same one or more periods of time,
         (ii) determining a transaction rate based on the transaction data from the POS terminals, and
         (iii) generating a function relating the transaction rate to the number of guests; and
   determining a current guest traffic level in the physical store during a runtime phase that occurs after the pre-processing phase, wherein the determining comprises:
      receiving, by the computer system from the POS terminals positioned in the checkout area of the physical store, real-time transaction data for a current period of time;
      receiving, by the computer system from the cameras positioned throughout the physical store, image data captured by the cameras during the current period of time;
      providing, by the computer system, the real-time transaction data as input to the store model trained during the pre-processing phase;
      receiving, by the computer system and as output from the store model, a current guest traffic level in the physical store for the current period of time;
      generating, by the computer system, information about the current guest traffic level in the physical store for presentation in graphical user interface (GUI) displays of one or more guest computing devices, wherein the information comprises (i) a graphical representation indicating average guest traffic levels over a predetermined time period and (ii) a graphical element overlaying at least a portion of the graphical representation, wherein the graphical element indicates the current guest traffic level in the physical store for the current period of time relative to the average guest traffic levels over the predetermined time period;
      generating, by the computer system, device output data about guest traffic levels in physical stores for presentation in graphical user interface (GUI) displays of one or more guest computing devices, wherein the device output data comprises a user interface element that is selectable by a guest at the one or more guest computing devices to cause the one or more guest computing devices to request and present a current guest traffic level at a particular physical store;
      returning, by the computer system to the one or more guest computing devices, the device output data, wherein the one or more guest computing devices are configured to, in response to receiving the device output data, present the user interface element in the respective GUI displays;
      receiving, by the computer system from the one or more guest computing devices, guest selection of the user interface element to request and present the current guest traffic level at the particular physical store;
      updating, by the computer system, the device output data to present the current guest traffic level in the particular physical store in the GUI displays of the one or more guest computing devices, wherein the updated device output data comprises (i) a graphical representation indicating average guest traffic levels over a predetermined time period for the particular physical store, (ii) a graphical element overlaying at least a portion of the graphical representation, wherein the graphical element indicates the current guest traffic level in the particular physical store for the current period of time relative to the average guest traffic levels over the predetermined time period for the particular physical store, and (iii) another user interface element that is selectable by a guest at the one or more guest computing devices to cause the one or more computing devices to request and present push notifications from the computer system indicating that the particular physical store is not busy;

returning, by the computer system to the one or more guest computing devices, the updated device output data about the current guest traffic level in the particular physical store, wherein the one or more guest computing devices are configured to, in response to receiving the updated device output data, update the respective GUI displays to present (i) the graphical representation, (ii) the graphical element, and (iii) the other user interface element in the respective GUI displays;

receiving, by the computer system from the one or more guest computing devices, guest selection of the other user interface element, wherein the guest selection of the other user interface element comprises a request for the push notifications from the computer system indicating that the particular physical store is not busy;

repeatedly determining, by the computer system and in response to the guest selection of the other user interface element, whether the current guest traffic level in the particular physical store is less than a threshold level;

automatically generating, by the computer system and based on a determination that the current guest traffic level is less than the threshold level, a push notification indicating that the particular physical store is not busy; and transmitting, by the computer system to the one or more guest computing devices, the push notification to cause the one or more guest computing devices to present, in real-time and during the runtime phase, the push notification.

12. The method of claim 11, wherein the real-time transaction data is generated by the POS terminals in the physical store in response to guests completing purchases during respective checkout processes at the POS terminals in the checkout area of the physical store.

13. The method of claim 11, wherein the runtime phase comprises the current period of time.

14. The method of claim 11, wherein the method further comprises: returning information about the current guest traffic level to the one or more guest computing devices to further cause the one or more guest computing devices to present a user interface element in the respective GUI displays, wherein the user interface element is selectable by a guest at the one or more guest computing devices to cause the one or more guest computing devices to present the push notification at the one or more guest computing devices indicating that the physical store is not busy.

15. The method of claim 14, wherein the method further comprises:

receiving, by the computer system from the one or more guest computing devices, the guest selection of the user interface element;

determining, by the computer system and in response to the guest selection of the user interface element, whether the current guest traffic level is less than a threshold level;

generating, by the computer system and based on determining that the current guest traffic level is less than the threshold level, a recommendation for the guest to make a trip to the physical store; and providing, by the computer system to the one or more guest computing devices, the recommendation in the push notification for presentation at the one or more guest computing devices.

16. The method of claim 11, wherein the method further comprises:

receiving, by the computer system from the one or more guest computing devices, guest input indicating guest interactions with the information about the current guest traffic level in the physical store that is presented in the respective GUI displays;

determining, by the computer system and based on the guest input, guest behaviors;

generating, by the computer system, custom options and push notifications for each of the guests based on the guest behaviors; and returning, by the computer system, the custom options and the push notifications to the one or more guest computing devices for presentation in the respective GUI displays.

17. The method of claim 11, wherein the store model is trained to generate sets of estimates for each of a plurality of time periods, wherein each of the sets of estimates includes an estimated number of transactions based on the transaction data for a time period amongst the plurality of time periods and an estimated number of guests per transaction during the time period.

18. The method of claim 11, wherein:

the real-time transaction data comprises a number of transactions that are performed at the POS terminals positioned in the checkout area of the physical store during the current period of time, wherein the store model is trained to determine the current guest traffic level based on:

generating a current set of estimates for the current period of time, the current set of estimates including a current estimated number of transactions and a current estimated number of guests per transaction for the current period of time; and determining a current number of guests in the physical store based on correlating the number of transactions and the estimated number of guests per transaction.

19. A method for determining store traffic levels, the method comprising:

during a pre-processing phase:

receiving, by a computer system from internal data sources located within a physical store, store data for the physical store generated by the internal data sources, wherein the internal data sources include cameras positioned throughout the physical store and point of sale (POS) terminals positioned in a checkout area of the physical store, wherein the store data comprises image data from the cameras and transaction data from the POS terminals;

determining, by the computer system, numbers of the guests in the physical store during one or more periods of time based on image processing of the image data to visually identify the guests; and generating, by the computer system, a register volume data for the one or more periods of time based on the transaction data;

generating and training, by the computer system, a store model to correlate values from real-time store data with guest traffic levels in the physical store, wherein the store model is trained using a process comprising:

(i) correlating the determined number of guests in the physical store with the transaction data from the POS terminals during the same one or more periods of time,
(ii) determining a transaction rate based on the transaction data from the POS terminals, and
(iii) generating a function relating the transaction rate to the number of guests; and during a runtime phase:
receiving, by the computer system from the POS terminals positioned in the checkout area of the physical store, real-time transaction data for a current period of time;
receiving, by the computer system from the cameras positioned throughout the physical store, image data captured by the cameras during the current period of time;
storing, by the computer system in a data store, the real-time transaction data and the image data for the current period of time for processing at a later time;
providing, by the computer system, the real-time transaction data as input to the store model;
receiving, by the computer system and as output from the store model, a current guest traffic level in the physical store for the current period of time;
generating, by the computer system, device output data about guest traffic levels in physical stores for presentation in graphical user interface (GUI) displays of one or more guest computing devices, wherein the device output data comprises a user interface element that is selectable by a guest at the one or more guest computing devices to cause the one or more guest computing devices to request and present a current guest traffic level at a particular physical store;
returning, by the computer system to the one or more guest computing devices, the device output data, wherein the one or more guest computing devices are configured to, in response to receiving the device output data, present the user interface element in the respective GUI displays;
receiving, by the computer system from the one or more guest computing devices, guest selection of the user interface element to request and present the current guest traffic level at the particular physical store;
updating, by the computer system, the device output data to present the current guest traffic level in the particular physical store in the GUI displays of the one or more guest computing devices, wherein the updated device output data comprises (i) a graphical representation indicating average guest traffic levels over a predetermined time period for the particular physical store, (ii) a graphical element overlaying at least a portion of the graphical representation, wherein the graphical element indicates the current guest traffic level in the particular physical store for the current period of time relative to the average guest traffic levels over the predetermined time period for the particular physical store, and (iii) another user interface element that is selectable by the guest at the one or more guest computing devices to cause the one or more guest computing devices to request and present push notifications from the computer system indicating that the particular physical store is not busy;
returning, by the computer system to the one or more guest computing devices, the updated device output data about the current guest traffic level in the particular physical store, wherein the one or more guest computing devices are configured to, in response to receiving the updated device output data, update the respective GUI displays to present (i) the graphical representation, (ii) the graphical element, and (iii) the other user interface element in the respective GUI displays;
receiving, by the computer system from the one or more guest computing devices, guest selection of the other user interface element, wherein the guest selection of the other user interface element comprises a request for the push notifications from the computer system indicating that the particular physical store is not busy;
repeatedly determining, by the computer system and in response to the guest selection of the other user interface element, whether the current guest traffic level in the particular physical store is less than a threshold level;
automatically generating, by the computer system and based on a determination that the current guest traffic level is less than the threshold level, a push notification indicating that the particular physical store is not busy; and
transmitting, by the computer system to the one or more guest computing devices, the push notification to cause the one or more guest computing devices to present, in the respective GUI displays, the push notification.

20. The method of claim 19, wherein receiving, by the computer system from the one or more guest computing devices, the guest selection of the user interface element to request and present the current guest traffic level at the particular physical store comprises: receiving guest selection of a particular store, a particular store location, or a particular day for which the current guest traffic level is requested by the guest.

* * * * *